(12) United States Patent
Chapman

(10) Patent No.: US 9,085,978 B2
(45) Date of Patent: Jul. 21, 2015

(54) ROTARY VANE ACTUATORS

(75) Inventor: Roger Charles Chapman, Farnham (GB)

(73) Assignee: KINETROL LIMITED, Surrey (GB)

( * ) Notice: Subject to any disclaimer, the term of this patent is extended or adjusted under 35 U.S.C. 154(b) by 1113 days.

(21) Appl. No.: 12/957,871

(22) Filed: Dec. 1, 2010

(65) Prior Publication Data

US 2012/0137873 A1 Jun. 7, 2012

(51) Int. Cl.
*F01C 9/00* (2006.01)
*F15B 15/12* (2006.01)
*F01C 19/06* (2006.01)
*F01C 21/08* (2006.01)
*F03C 4/00* (2006.01)
*F16J 15/54* (2006.01)

(52) U.S. Cl.
CPC .............. *F01C 9/002* (2013.01); *F01C 19/06* (2013.01); *F01C 21/0881* (2013.01); *F03C 4/00* (2013.01); *F15B 15/125* (2013.01); *F16J 15/545* (2013.01)

(58) Field of Classification Search
CPC .......... F15B 15/12; F15B 15/125; B60S 1/10; B60S 1/105; B60S 1/12; B60S 1/125; F01C 21/0881; F01C 9/002; F01C 19/06; F03C 4/00; F16J 15/545
USPC ........................ 92/120, 121, 125, 122; 91/339
See application file for complete search history.

(56) References Cited

U.S. PATENT DOCUMENTS

| | | | | | |
|---|---|---|---|---|---|
| 944,221 | A | * | 12/1909 | Stowell | 91/295 |
| 1,565,493 | A | * | 12/1925 | Oishei et al. | 92/125 |
| 1,777,143 | A | * | 9/1930 | Hueber | 92/124 |
| 2,012,817 | A | * | 8/1935 | Horton et al. | 92/124 |
| 2,556,648 | A | * | 6/1951 | Gorsuch | 92/125 |
| 2,612,874 | A | * | 10/1952 | Deibel | 91/395 |
| 2,612,875 | A | * | 10/1952 | O'Shei | 92/125 |
| 2,613,121 | A | * | 10/1952 | Oishei et al. | 92/123 |
| 2,808,300 | A | * | 10/1957 | O'Shei | 92/125 |
| 2,984,220 | A | * | 5/1961 | Rosenberger | 92/125 |
| 3,155,013 | A | * | 11/1964 | Rumsey | 91/409 |
| 3,207,048 | A | * | 9/1965 | Rumsey | 92/125 |
| 3,359,870 | A | * | 12/1967 | Purcell | 92/121 |
| 3,456,562 | A | * | 7/1969 | Hansen et al. | 92/122 |
| 3,890,885 | A | * | 6/1975 | Nash | 92/125 |
| 4,066,007 | A | * | 1/1978 | Barlow | 92/125 |
| 4,611,797 | A | * | 9/1986 | Cetnarowski | 269/57 |
| 6,289,787 | B1 | * | 9/2001 | Underwood et al. | 92/121 |

* cited by examiner

*Primary Examiner* — Edward Look
*Assistant Examiner* — Michael Quandt
(74) *Attorney, Agent, or Firm* — Marvin Petry; Stites & Harbison PLLC

(57) ABSTRACT

A rotary vane type actuator includes a vane assembly for converting pressure from a pressurized medium within the actuator into rotational movement. The vane assembly has a rotatable vane and a vane seal for preventing leakage of pressurized medium through or around the vane assembly. A side-plate is attached to the rotatable vane and the side-plate has a limiting protrusion that abuts the vane to maintain a gap between the vane and the side-plate so that the seal in the gap is not extruded from between the vane and side-plate.

13 Claims, 5 Drawing Sheets

Prior Art

ROTARY VANE ACTUATORS

BACKGROUND OF THE INVENTION

1. Field of the Invention

The present invention relates to rotary vane actuators and in particular, the vane assembly of fluid rotary vane actuators.

2. Summary of the Prior Art

A typical rotary vane type actuator has a casing to provide a fixed volume space. The fixed volume space is separated into a first and second chamber by a rigid paddle or vane assembly. A pressurised fluid is introduced through a port into the first chamber and pressure difference between the first and second chambers produces a torque on the vane resulting in rotational movement of the vane. As the vane rotates, the pressurised fluid continues to be introduced into the first chamber to maintain the pressure.

The lower pressure in the second chamber is allowed to escape to maintain a pressure difference across the vane.

Energy is fed into the actuator by the flow of pressurised fluid and converted into mechanical work in the form of rotation of the output shaft against the torque imposed by its load.

The construction of the vane assembly is important to the efficiency of the actuator. In particular, it is important that the vane assembly provides a seal between the first and second chambers so that the energy from the input flow of pressurised fluid is efficiently converted into rotational work, rather than being wasted by leaking between chambers.

To provide this seal, a typical vane assembly has a seal made of a flexible material, such as a rubber, attached to a rigid vane. The seal is attached to the vane by a side-plate and a retaining nut and bolt extending through the side-plate, seal and vane. The seal is thus sandwiched between side-plate and vane so that the side-plate clamps the seal in position. A seal expander, made from a springy material such as steel, can also be sandwiched between the seal and side-plate and is shaped to contact and apply force to the inner surface of the seal lip and keep the seal lip in contact with the inner surface of the chamber cavity. It overcomes the problem of creep under stress of the seal material.

SUMMARY OF THE INVENTION

It is difficult to maintain an appropriate force under the fixing screws. If the screw is not tightened enough, the seal will leak between at the seal/vane interface. If the screw is overtightened, the seal will become extruded between the side-plate and vane. This extrusion leads to deformation of the seal and therefore imperfect seal geometry that will increase leakage, cause premature wear and high friction. The problem is accentuated under high temperature operating conditions.

The present inventors have found a way to overcome this problem so that the seal may not be over-clamped and the seal is maintained.

At its most general, the present invention provides a vane assembly for a rotary vane actuator, the vane assembly having a seal positioned between a vane and a side-plate, wherein the vane assembly has a limiting portion to limit the movement of the side-plate towards the vane so that a gap for the seal is maintained between the side-plate and the vane.

Accordingly, in a first aspect of the invention the present invention may provide a rotary vane actuator having a housing assembly and a vane assembly, wherein the housing has a cavity for accommodating the vane assembly, the vane assembly dividing the cavity into a first chamber and a second chamber, and the vane assembly has a rotatable vane, the rotatable vane having a first and a second side; a vane axle, the vane axle projecting from the housing and being connected to the rotatable vane to convert pressure exerted on the vane into rotational motion; a first side-plate on the first side of the rotatable vane; a retaining means for connecting the first side-plate to the rotatable vane; a first seal gap, the first seal gap being between the rotatable vane and the first side-plate; a first vane seal for sealing the vane, the first vane seal being in the first seal gap; and a first limiting protrusion, the first limiting protrusion being connected to the first side-plate for maintaining the first seal gap and the first limiting protrusion abutting the first side of the rotatable vane so as to limit compression of the first vane seal between the first side-plate and the rotatable vane.

According to the second aspect of the invention there may be provided a rotary vane actuator having a housing assembly and a vane assembly, wherein the housing has a cavity for accommodating the vane assembly, the cavity being divided by the vane assembly in a first chamber and a second chamber, and the vane assembly has a rotatable vane, the rotatable vane having a first and a second side; a vane axle, the vane axle projecting from the housing and being connected to the rotatable vane to convert pressure exerted on the vane into rotational motion; a first side-plate on the first side of the rotatable vane; a retaining means for connecting the first side-plate to the rotatable vane; a first seal gap, the first seal gap being between the rotatable vane and the first side-plate; a first vane seal for sealing the vane, the first vane seal being in the first seal gap; and a first limiting protrusion, the first limiting protrusion being connected to the first side of the rotatable vane for maintaining the first seal gap and the first limiting protrusion abutting the first side-plate so as to limit compression of the first vane seal between the first side-plate and the rotatable vane.

According to a third aspect of the invention there may be provided a rotary vane actuator having a housing assembly and a vane assembly, wherein the housing has a cavity for accommodating the vane assembly, the cavity being divided by the vane assembly in a first chamber and a second chamber, and the vane assembly has a rotatable vane, the rotatable vane having a first and a second side; a vane axle, the vane axle projecting from the housing and being connected to the rotatable vane to convert pressure exerted on the vane into rotational motion; a first side-plate on the first side of the rotatable vane; a retaining means for connecting the first side-plate to the rotatable vane; a first seal gap, the first seal gap being between the rotatable vane and the first side-plate; a first vane seal for sealing the vane, the first vane seal being in the first seal gap; and a first limiting spacer, the first limiting spacer being positioned between the first side of the rotatable vane and the first side-plate for maintaining the first seal gap so as to limit compression of the first vane seal between the first side-plate and the rotatable vane.

The present invention also provides a vane assembly as for use in a rotary vane actuator according to the first to third aspects.

Thus, according to a fourth aspect of the invention there may be provided a vane assembly for use in a rotary vane actuator, the vane assembly having a rotatable vane, the rotatable vane having a first and a second side; a vane axle, the vane axle projecting from the housing and being connected to the rotatable vane to convert pressure exerted on the vane into rotational motion; a first side-plate on the first side of the rotatable vane; a retaining means for connecting the first side-plate to the rotatable vane; a first seal gap, the first seal gap being between the rotatable vane and the first side-plate; a first vane seal for sealing the vane, the first vane seal being in the first seal gap; and a first limiting protrusion, the first limiting protrusion being connected to the first side-plate for maintaining the first seal gap and the first limiting protrusion abutting the first side of the rotatable vane so as to limit compression of the first vane seal between the first side-plate and the rotatable vane.

According to a fifth aspect of the invention there may be provided a vane assembly for use in a rotary vane actuator, the vane assembly having a rotatable vane, the rotatable vane having a first and a second side; a vane axle, the vane axle projecting from the housing and being connected to the rotatable vane to convert pressure exerted on the vane into rotational motion; a first side-plate on the first side of the rotatable vane; a retaining means for connecting the first side-plate to the rotatable vane; a first seal gap, the first seal gap being between the rotatable vane and the first side-plate; a first vane seal for sealing the vane, the first vane seal being in the first seal gap; and a first limiting protrusion, the first limiting protrusion being connected to the first side of the rotatable vane for maintaining the first seal gap and the first limiting protrusion abutting the first side-plate so as to limit compression of the first vane seal between the first side-plate and the rotatable vane.

According to a sixth aspect of the invention there may be provided a vane assembly for use in a rotary vane actuator, the vane assembly having a rotatable vane, the rotatable vane having a first and a second side; a vane axle, the vane axle projecting from the housing and being connected to the rotatable vane to convert pressure exerted on the vane into rotational motion; a first side-plate on the first side of the rotatable vane; a retaining means for connecting the first side-plate to the rotatable vane; a first seal gap, the first seal gap being between the rotatable vane and the first side-plate; a first vane seal for sealing the vane, the first vane seal being in the first seal gap; and a first limiting spacer, the first limiting spacer being positioned between the first side of the rotatable vane and the first side-plate for maintaining the first seal gap so as to limit compression of the first vane seal between the first side-plate and the rotatable vane.

Note that in all aspects of the invention discussed above it is preferable that the actuator is a pneumatic actuator and the fluid is a gas, e.g. air.

BRIEF DESCRIPTION OF THE DRAWINGS

Embodiments of the present invention will be described in detail, by way of example, with reference to the following drawings, in which.

DETAILED DESCRIPTION

Figure 1:
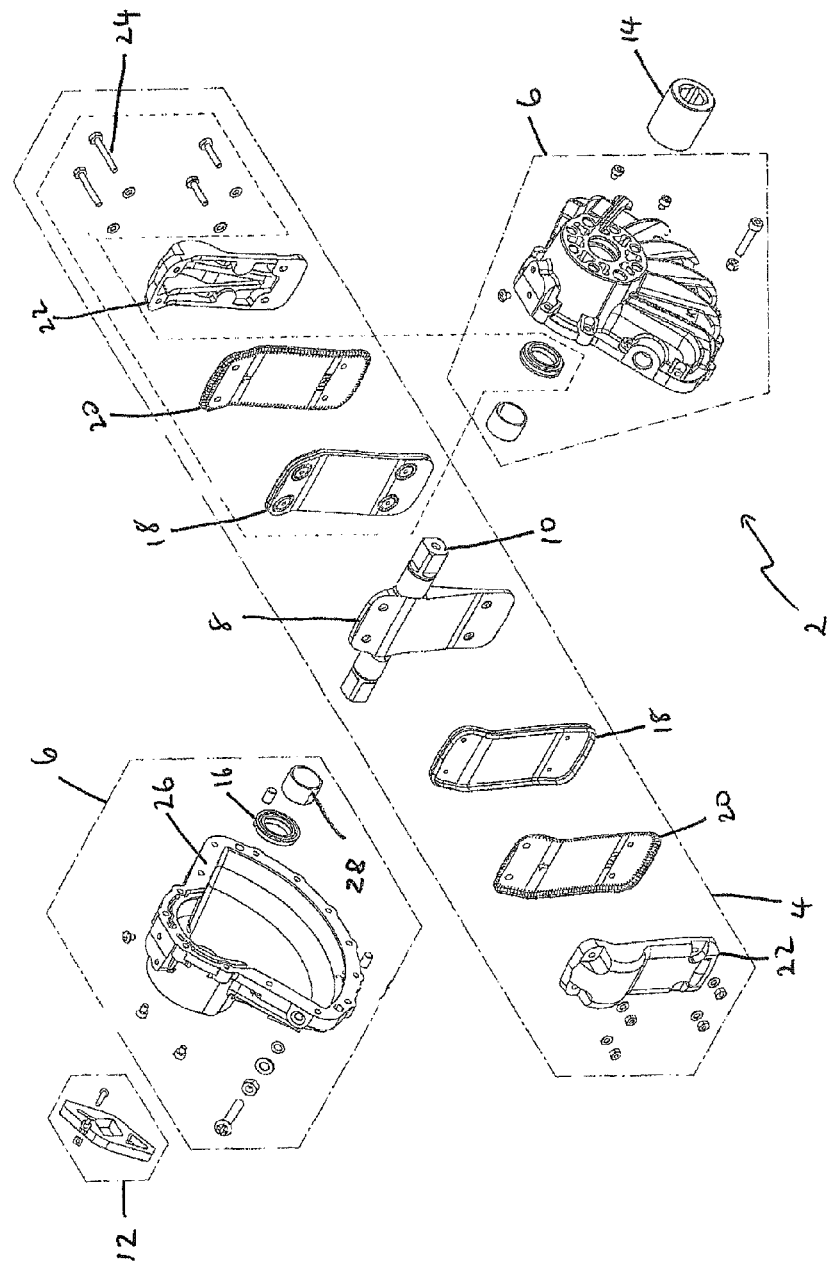
FIG. 1 shows an exploded perspective view of a standard rotary vane actuator.

Referring to FIG. 1, the standard rotary vane actuator 2 has a vane assembly 4 that is housed within a case assembly 6.

The vane assembly 4 has a rigid metal standard vane 8 with an output drive 10 having a cylindrical part and square parts which connect to an indicator 12 and a coupling device 14. Shaft seals 16 provide a seal around the cylindrical part of the output drive 10.

On each side of the standard vane 8, a vane seal 18, expander 20, and side-plate 22 are attached by vane fixings 24.

The case assembly 6 has a shell 26 in two parts for ease of assembly and bushes 28 to surround the bearings of the standard vane 8.

Figure 2:
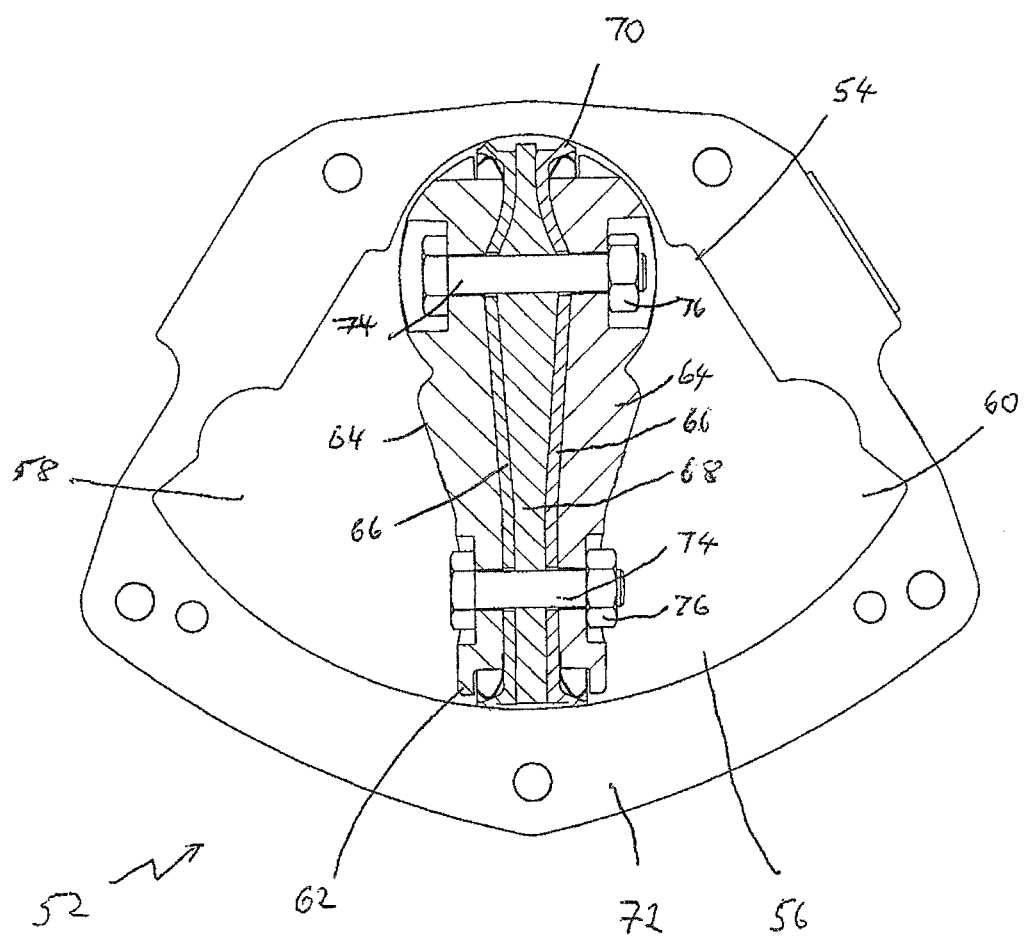
FIG. 2 shows a simplified cross section of a standard rotary vane actuator.

Referring to FIG. 2, the cross-section shows an assembled standard actuator 52 having a shell wall 54 defining a cavity 56. The cavity 56 has a first chamber 58 and a second chamber 60 separated by the vane assembly 62.

The vane assembly 62 is layered to have a side-plate 64, seal expander, vane seal 66, vane 68, seal expander and side-plate 64 construction. Each seal expander is a thin layer of material positioned between the side-plate 64 and the vane seal 66.

Each vane seal 66 has sealing portions 70 that extend from the vane assembly 62 to abut the shell wall 54 of a case assembly 72 in order to provide a seal between the first 58 and second 60 chambers of the actuator 52.

Preferably each side-plate forms at least 25% by volume of the vane assembly and preferably the vane assembly occupies at least 20% by volume of the cavity of the actuator.

The layered vane assembly 62 is held together with retaining fixtures having a retaining bolt 74 and a retaining nut 76. The retaining bolt 74 and nut 76 are tightened to clamp the side-plates 64 and vane seal 66 to the vane 68.

Although not shown in this embodiment, the actuator may have a stop embedded in the shell wall 54 to prevent the vane assembly 62 (when in use) from hitting the shell wall 54.

Figure 3:
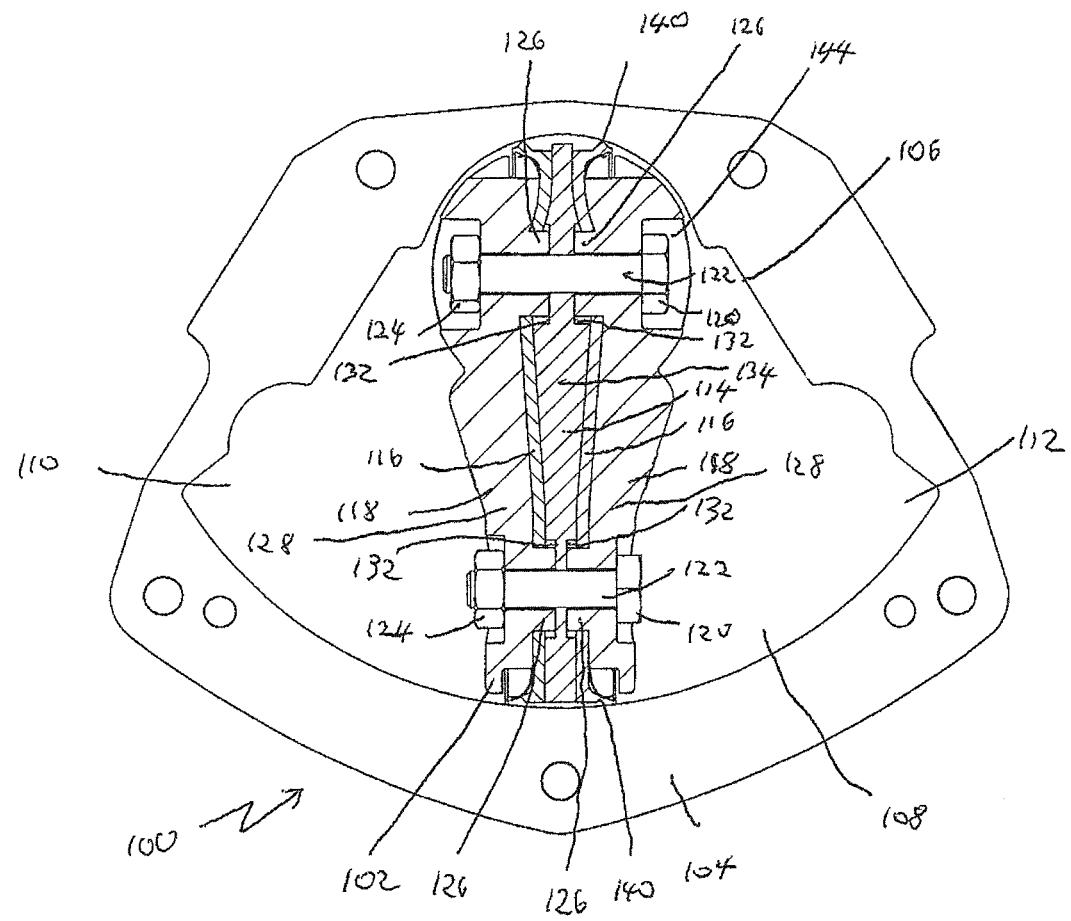
FIG. 3 shows a cross-section of a rotary vane actuator of the present invention.

Referring to FIG. 3, a cross-section of an actuator 100 of the present invention is shown. The actuator 100 has a vane assembly 102 held within a case assembly 104.

The case assembly 104 has a shell wall 106 defining a cavity 108. The cavity 108 is divided into a first chamber 110 and a second chamber 112 and the first 110 and second 112 chambers are separated by the vane assembly 102.

The vane assembly 102 has a rigid metal vane 114 in the centre of the assembly 102, a seal 116 of a flexible material such as polyurethane on each side of the vane 114 and a side-plate 118 to hold each seal 116 adjacent to the vane 114. A thin seal expander is positioned between each side-plate 118 and seal 116.

The side-plates 118 hold the seals 116 in position by two or more retaining fixings 120, which each have a retaining bolt 122 and a retaining nut 124 to adjust the tightening of the retaining fixings 120. The retaining bolt 122 extends through the side-plates 118, seals 116 and the vane 114.

Each side-plate 118 has two or more protrusions 126 extending from a body 128 of the side-plate 118. Each protrusion 126 abuts the vane 114 in order to limit the clamping of the side-plate 118 to the vane 114 by the retaining fixings 120.

When the retaining fixings 120 are tightened, the side-plate 118 moves towards the vane 114 in order to clamp the seal 116 to the vane 114. In due course, the protrusions 126 of the side-plate 118 hit the vane 114 and further tightening of the retaining fixings 120 is prevented.

The protrusions 126 thus provide a seal gap between the vane 114 and the side-plate body 128 for the seal 116 so that the seal 116 is suitably fixed in position next to the vane 114 but is not compressed so as to extrude the seal 116 from between the vane 114 and side-plate 118.

The vane 114 has indentations 132 in a body of the vane 134 to accommodate the protrusions 126 of the side-plate 118. The depth of the indentation 132 with respect to the vane body 134 is smaller than the height of the protrusion 126 from the side-plate body 128. So, when the protrusion 126 abuts the vane 114 at the indentation 132, the difference between the depth of the indentation 132 and the height of the protrusion 126 provides the seal gap between the vane body 134 and the side-plate body 128 to accommodate the seal 116.

The distance between the vane body 134 and the side-plate body 128 when the protrusion 126 abuts the vane 114 within the indentation 132 provides the seal gap width 136.

The seal gap width is roughly the thickness of the seal layer 116. If the seal gap width is significantly larger than seal 116 thickness, the seal 116 will not be held in position satisfactorily. On the other hand, if the seal gap width is significantly smaller than the seal 116 thickness, the seal 116 may be extruded from between the vane 114 and the side-plate 118. Some compression of the seal 116 by the side-plate 118 may be tolerated.

In this embodiment, the protrusions 126 abut directly with the indentations 132 of the vane 114. The seal may have an interstitial layer positioned around the side-plate protrusions 126 and contacting the vane 114 to provide local sealing with the vane 114. Such an interstitial layer is compressible. It is also possible to provide a rigid interstitial layer in the same location, but the interstitial layer is then part of the vane.

When an interstitial layer is present, the seal gap width 130 must be maintained when the retaining fixings 120 & 124 are fully tightened. In other words, the interstitial layer may be compressible so long as the compression of the interstitial layer does not reduce the seal gap width to a distance where the seal 116 may be extruded from the vane assembly 102.

When assembled into the vane assembly, each seal 116 has protruding portions 140 projecting from both ends of the vane assembly 102 so as to extend to the shell wall 106 of the case assembly 104. The protruding portions 140 maintain a seal between the first 110 and second 112 chambers.

The side-plates 118 can have a well 144 to surround each end 148 of the retaining fixings 120. The wells 144 allow at least part of the retaining fixings 120 and 124 to be sunken into the side-plate 118.

The side-plates 118 may be made of moulded plastics material or other rigid material. The side-plates 118 may be used to provide the majority of the volume of the vane assembly 102. In this way, the vane-assembly 102 occupies a significant volume of the cavity 108 of the case assembly 104. By increasing the volume of the side-plates 118, the volume of dead-space within the cavity 108 of the case assembly 104 is reduced and the actuator 100 functions more efficiently.

The use of moulded plastics material for side-plates 118 is a cost effective way to manufacture them. In addition, the side-plates 118 absorbs shock when the vane assembly 102 hits an actuator stop (not shown) embedded in the shell wall 106 of the case assembly 104. As a result, the vane assembly 102 is less likely to sustain damage during operation. Of course, the skilled person would recognise that the side-plate may be made of any suitable material In particular, the side-plate may be made of metal.

Figure 4:
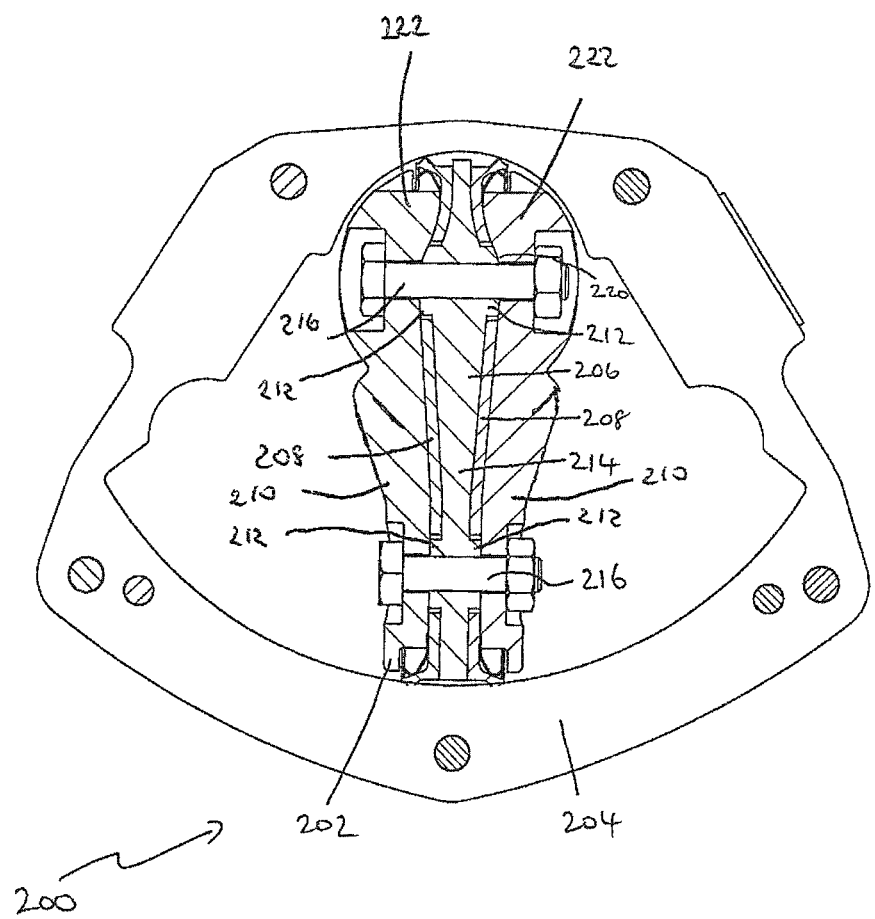
FIG. 4 shows a cross-section of another rotary vane actuator of the present invention.

Referring to FIG. 4, a cross-section of another actuator 200 of the present invention is shown. The actuator 200 has a vane assembly 202 held within a case assembly 204.

The embodiment of the present invention shown in FIG. 4 is substantially the same as the embodiment shown in FIG. 3 with respect to the case assembly, shell wall, cavity, first and second chambers, seal, retaining fixings, retaining nut and bolt, seal gap, seal gap width, interstitial layer, seal protruding portions and wells in the side-plate. However, the vane assembly 202 of FIG. 4 varies from the embodiment in FIG. 3 and so is described in more detail herein.

The vane assembly 202 has a rigid metal vane 206 in the centre of the assembly 202, a seal 208 of a flexible material such as polyurethane on each side of the vane 206 and a side-plate 210 to hold each rubber seal 208 adjacent to the vane 206.

The vane 206 has two protrusions 212 extending from each side of a body 214 of the vane. Each protrusion 212 abuts the side-plate 210 in order to limit the clamping of the side-plate 210 to the vane 206 by the retaining fixings 216.

When the retaining fixings 216 are tightened, the side-plate 210 moves towards the vane 206 in order to clamp the seal 208 to the vane 206. In due course, the protrusions 212 of the vane 206 hit the side-plate 210 and further tightening of the retaining fixings 216 is prevented.

The protrusions 212 of the vane 206 thus provide a seal gap between the vane body 214 and the side-plate 210 for the seal 208 so that the seal 208 is suitably fixed in position next to the vane 206 but is not compressed so as to extrude the seal 208 from between the vane 206 and side-plate 210.

The top of the side-plate 210 is curved 220 at one end to accommodate the upper protrusion 212 of the vane 206. The depth of the curve 220 with respect to the side-plate body is smaller than the height of the protrusion 212 from the vane body 214. So, when the protrusion 212 abuts the side-plate 210 at the curve 220, the difference between the depth of the curve 220 and the height of the protrusion 212 provides the seal gap between the vane body 214 and the side-plate body 222 in order to accommodate the seal 208.

The distance between the vane body 214 and the side-plate body 222 when the protrusion 212 abuts the side-plate 210 within the curve 220 thus provides the seal gap width. In this embodiment, all the protrusions 212 abut directly with the side-plate 210.

Figure 5:
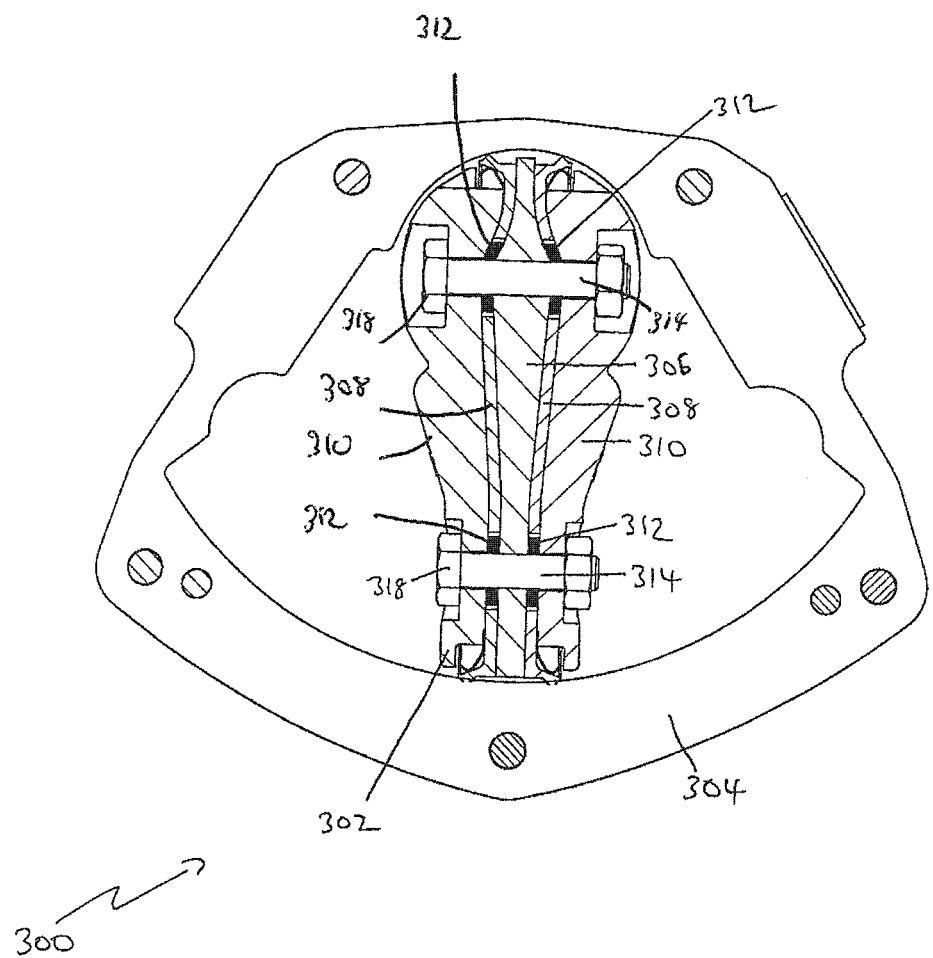
FIG. 5 shows a cross-section of a further rotary vane actuator of the present invention.

Referring to FIG. 5, a cross-section of a further actuator 300 of the present invention is shown. The actuator 300 has a vane assembly 302 held within a case assembly 304.

The embodiment of the present invention shown in FIG. 5 is substantially the same as the embodiment shown in FIG. 3 with respect to the case assembly, shell wall, cavity, first and second chambers, seal, retaining fixings, retaining nut and bolt, seal gap, seal gap width, interstitial layer, seal protruding portions and wells in the side-plate. However, the vane assembly 302 shown in FIG. 5 varies from the embodiment in FIG. 3 and so is described in more detail herein.

The vane assembly 302 has a rigid metal vane 306 in the centre of the assembly 302, a rubber seal 308 on each side of the vane 306 and a side-plate 310 to hold each rubber seal 308 adjacent to the vane 306.

The vane assembly 302 also has four limiting spacers 312, two per fixing screw. Two limiting spacers 312 are positioned between the vane 306 and each side-plate 310 in order to limit the clamping of the side-plate 310 to the vane 306 by the retaining fixings 314. The spacers 312 have an aperture 316 for accommodating the retaining bolt 318.

When the retaining fixings 314 are tightened, the side-plate 310 moves towards the vane 306 in order to clamp the seal 308 to the vane 306. In due course, the side-plate 310 abuts each spacer 312 and in turn each spacer 312 abuts the vane 306. The spacers 312 are substantially incompressible and, as a result, further tightening of the retaining fixings 314 is prevented.

The spacers 312 of the vane assembly 302 thus provide a seal gap between the vane 306 and the side-plate 310 for the seal 308 so that the seal 308 is suitably fixed in position next to the vane 306 but is not compressed so as to extrude the seal 308 from between the vane 306 and side-plate 310.

The distance between the vane 306 and the side-plate 310 when the spacers 312 abut the side-plate 310 and vane 306 provides the seal gap width. In this embodiment, the spacers 312 directly abut the vane 306 and the side-plate 310.

The spacers 312 may be any shape or configuration so long as they maintain the seal gap width in order to avoid over-compression of the seal in the seal gap. In this embodiment, the lower spacers are essentially flat cylindrical washers. The upper spacers are curved washers and are curved to fit the contour of the vane 306 and the side-plate 310.

In all the embodiments described above, the seal assemblies are held onto the vane by nuts and bolts. It is also possible to provide threaded studs adhered to and extending from the vane which pass through the seals and side-plates and which receive nuts which, when tightened on the studs, hold the side-plates and seals to the vane in the same way as the bolts and nuts described in the embodiments.

What is claimed is:

1. A rotary vane actuator having a housing assembly and a vane assembly, wherein
the housing has a cavity for accommodating the vane assembly, the vane assembly dividing the cavity into a first chamber and a second chamber, and
the vane assembly has a solid rotatable vane, the solid rotatable vane having a first and a second side; a vane axle, the vane axle projecting from the housing and being connected to the solid rotatable vane to convert pressure exerted on the vane into rotational motion;
a first side-plate on the first side of the solid rotatable vane; a first seal gap, the first seal gap being between the solid rotatable vane and the first side-plate; a first vane seal for sealing the vane, the first vane seal being in the first seal gap; and a plurality of first limiting protrusions, the plurality of first limiting protrusions being connected to the first side-plate for maintaining the first seal gap and the plurality of first limiting protrusions abutting the first side of the solid rotatable vane so as to limit compression of the first vane seal between the first side-plate and the solid rotatable vane, said plurality of first limiting protrusions being spaced apart on said first side-plate and said first seal gap and said first vane seal being between said plurality of first limiting protrusions;
a second side-plate on the second side of the solid rotatable vane, a second seal gap, the second seal gap being between the solid rotatable vane and the second side-plate; and a second seal for sealing the vane, the second vane seal being in the second seal gap, a plurality of second limiting protrusions, the plurality of second limiting protrusion being connected to the second side-plate for maintaining the second seal gap and the plurality of second limiting protrusions abutting the second side of the solid rotatable vane so as to limit compression of the second vane seal between the second side-plate and the solid rotatable vane, said plurality of second limiting protrusions being spaced apart on said second side-plate and said second seal gap and said second vane seal being between said plurality of second limiting protrusions;

wherein:
each of said plurality of first limiting protrusions is aligned with a respective one of said plurality of second limiting protrusions; and
a plurality of retainers connect the first and second side-plates to the solid rotatable vane, each retainer passing through a corresponding one of said plurality of first limiting protrusions and the aligned respective one of said plurality of second limiting protrusions.

2. The rotary vane actuator according to claim 1, wherein the width of the first and second seal gaps are each substantially the thickness of their respective first and second vane seals.

3. The rotary vane actuator according to claim 1, wherein the retainers each comprise a retaining nut and retaining bolt, the retaining bolt extending through apertures in the solid rotatable vane, the first and second vane seals and first and second side plate side-plates.

4. The rotary vane actuator according to claim 1, wherein the side-plates are of shock-absorbent material.

5. The rotary vane actuator according to claim 4, wherein the shock absorbent material is a plastic.

6. The rotary vane actuator according to claim 1, wherein each side-plate forms at least 25% by volume of the vane assembly.

7. The rotary vane actuator according to claim 1, wherein the vane assembly occupies at least 20% by volume of the cavity of the actuator.

8. The rotary vane actuator according to claim 1, wherein each side-plate has a well for accommodating at least part of its retainer.

9. A rotary vane actuator having a housing assembly and a vane assembly, wherein
the housing has a cavity for accommodating the vane assembly, the cavity being divided by the vane assembly in a first chamber and a second chamber, and
the vane assembly has a solid rotatable vane, the solid rotatable vane having a first and a second side; a vane axle, the vane axle projecting from the housing and being connected to the solid rotatable vane to convert pressure exerted on the solid rotatable vane into rotational motion;
a first side-plate on the first side of the solid rotatable vane; a first seal gap, the first seal gap being between the solid rotatable vane and the first side-plate; a first vane seal for sealing the solid rotatable vane, the first vane seal being in the first seal gap; and a plurality of first limiting protrusions, the plurality of first limiting protrusions being connected to the first side of the solid rotatable vane for maintaining the first seal gap and the plurality of first limiting protrusions abutting the first side-plate so as to limit compression of the first vane seal between the first side-plate and the solid rotatable vane, said plurality of first limiting protrusions being spaced apart on the solid rotatable vane, and said first seal gap and said first vane seal being between said plurality of first limiting protrusions;
a second side-plate on the second side of the solid rotatable vane, a second seal gap, the second seal gap being between the solid rotatable vane and the second side-plate; and a second vane seal for sealing the vane, the second vane seal being in the second seal gap, a plurality of second limiting protrusions, the plurality of second limiting protrusions being connected to the second side of the solid rotatable vane for maintaining the second seal gap and the plurality of second limiting protrusions abutting the second side-plate so as to limit compression of the second vane seal between the second side-plate and the solid rotatable vane, said plurality of second limiting protrusions being spaced apart on the solid rotatable vane and said second seal gap and said second vane seal being between said plurality of second limiting protrusions;

wherein:
each of said plurality of first limiting protrusions is aligned with a respective one of said plurality of second limiting protrusions; and
a plurality of retainers connect the first and second side-plates to the solid rotatable vane, each retainer passing through a corresponding one of said plurality of first limiting protrusions and the aligned respective one of said plurality of second limiting protrusions.

10. A rotary vane actuator having a housing assembly and a vane assembly, wherein
the housing has a cavity for accommodating the vane assembly, the cavity being divided by the vane assembly in a first chamber and a second chamber, and
the vane assembly has a solid rotatable vane, the solid rotatable vane having a first and a second side; a vane axle, the vane axle projecting from the housing and being connected to the solid rotatable vane to convert pressure exerted on the solid rotational vane into rotational motion;
a first side-plate on the first side of the solid rotatable vane; a first seal gap, the first seal gap being between the solid rotatable vane and the first side-plate; a first vane seal for sealing the solid rotatable vane, the first vane seal being in the first seal gap; and a plurality of first limiting spacers, the plurality of first limiting spacers being positioned between the first side of the solid rotatable vane and the first side-plate for maintaining the first seal gap so as to limit compression of the first vane seal between the first side-plate and the solid rotatable vane, said plurality of first limiting spacers being spaced apart between the solid rotatable vane and the first side-plate, and said first seal gap and said first vane seal being between said plurality of first limiting spacers;
a second side-plate on the second side of the solid retainable vane; a second seal gap, the second seal gap being between the solid rotatable vane and the second side-plate; and a second vane seal for sealing the solid rotatable vane, the second vane seal being in the second seal gap, a plurality of second limiting spacers, the plurality of second limiting spacers being positioned between the second side of the solid rotatable vane and the second side-plate for maintaining the second seal gap so as to limit compression of the second vane seal between the second side-plate and the solid rotatable vane, said plurality of second limiting spacers being spaced apart between the solid rotatable vane and the second side-plate, and said second seal gap and said second vane seal being between said plurality of second limiting spacers;

wherein:
each of said plurality of first limiting spacers is aligned with a respective one of said second limiting spacers; and
a plurality of retainers connect the first and second side-plates to the solid rotatable vane, each retainer passing through a corresponding one of said plurality of first limiting spacers and the aligned respective one of said second limiting spaces.

11. A vane assembly for use in a rotary vane actuator, the vane assembly having a solid rotatable vane, the solid rotatable vane having a first and a second side; a vane axle, the vane axle projecting from the housing and being connected to the solid rotatable vane to convert pressure exerted on the vane into rotational motion;
a first side-plate on the first side of the solid rotatable vane; a first seal gap, the first seal gap being between the solid rotatable vane and the first side-plate; a first vane seal for sealing the vane, the first vane seal being in the first seal gap; and a plurality of first limiting protrusions, the plurality of first limiting protrusions being connected to the first side-plate for maintaining the plurality of first seal gap and the first limiting protrusions abutting the first side of the solid rotatable vane so as to limit compression of the first vane seal between the first side-plate and the solid rotatable vane, said plurality of first limiting protrusions being spaced apart on said first side-plate and said first seal gap and said first vane seal being between said plurality of first limiting protrusions;
a second side-plate on the second side of the solid rotatable vane, a second seal gap, the second seal gap being between the solid rotatable vane and the second side-plate; and a second vane seal for sealing the vane, the second vane seal being in the second seal gap, a plurality of second limiting protrusions, the plurality of second limiting protrusions being connected to the second side-plate for maintaining the second seal gap, and the plurality of second limiting protrusions abutting the second side of the solid rotatable vane so as to limit compression of the second vane seal between the second side-plate and the solid rotatable vane, said plurality of second limiting protrusions being spaced apart on said second side-plate and said second seal gap and said second vane seal being between plurality of second limiting protrusions;

wherein:
each of said plurality of first limiting protrusions is aligned with a respective one of said plurality of second limiting protrusions; and
a plurality of retainers connect the first and second side-plates to the solid rotatable vane, each retainer passing through a corresponding one of said plurality of first limiting protrusions and the aligned respective one of said plurality of second limiting protrusions.

12. A vane assembly for use in a rotary vane actuator, the vane assembly having a solid rotatable vane, the solid rotatable vane having a first and a second side; a vane axle, the vane axle projecting from the housing and being connected to the solid rotatable vane to convert pressure exerted on the solid rotatable vane into rotational motion;
a first side-plate on the first side of the solid rotatable vane; a first seal gap, the first seal gap being between the solid rotatable vane and the first side-plate; a first vane seal for sealing the vane, the first vane seal being in the first seal gap; and a plurality of first limiting protrusions, the plurality of first limiting protrusions being connected to the first side of the solid rotatable vane for maintaining the first seal gap and the plurality of first limiting protrusions abutting the first side-plate so as to limit compression of the first vane seal between the first side-plate and the solid rotatable vane, said plurality of first limiting protrusions being spaced apart on the solid rotatable vane and said first seal gap and said first vane seal being between said plurality of first limiting protrusions;
a second side-plate on the second side of the solid rotatable vane, a second seal gap, the second seal gap being between the solid rotatable vane and the second side-plate; and a second vane seal for sealing the vane, the second vane seal being in the second seal gap, a plurality of second limiting protrusions, the plurality of second limiting protrusions being connected to the second side of the solid rotatable vane for maintaining the second seal gap and the plurality of second limiting protrusions abutting the second side-plate so as to limit compression of the vane seal between the second side-plate and the solid rotatable vane, said plurality of second limiting protrusions being spaced apart on the solid rotatable vane, and said second seal hap and said second vane seal being between said plurality of second limiting protrusions;

wherein:
each of said plurality of first limiting protrusions is aligned with a respective one of said plurality of second limiting protrusions; and
a plurality of retainers connect the first and second side-plates to the solid rotatable vane, each retainer passing through a corresponding one of said plurality of first limiting protrusions and the aligned respective one of said plurality of second limiting protrusions.

13. A vane assembly for use in a rotary vane actuator, the vane assembly having a solid rotatable vane, the solid rotatable vane having a first and a second side; a vane axle, the vane axle projecting from the housing and being connected to the solid rotatable vane to convert pressure exerted on the vane into rotational motion;

a first side-plate on the first side of the solid rotatable vane; a first seal gap, the first seal gap being between the solid rotatable vane and the first side-plate; a first vane seal for sealing the solid rotatable vane, the first vane seal being in the first seal gap; and a plurality of first limiting spacers, the plurality of first limiting spacers being positioned between the first side of the solid rotatable vane and the first side-plate for maintaining the first seal gap so as to limit compression of the first vane seal between the first side-plate and the solid rotatable vane, said plurality of first limiting spacers being spaced apart between the solid rotatable vane and the first side-plate and said first seal gap and said first vane seal being between said plurality of first limiting spacers;

a second side-plate on the second side of the solid rotatable vane, a second seal gap, the seal gap being between the solid rotatable vane and the second side-plate; and a second vane seal for sealing the solid rotatable vane, the second vane seal being in the second seal gap, a plurality of second limiting spacers being positioned between the second side of the solid rotatable vane and the second side-plate for maintaining the second seal gap so as to limit compression of the second vane seal between the second side-plate and the solid rotatable vane, said plurality of second limiting spacers being spaced apart between the solid rotatable vane and the second side-plate, and said second seal gap and said second vane seal being between said plurality of second limiting spacers;

wherein:
each of said plurality of first limiting spacers is aligned with a respective one of said second limiting spacers; and
a plurality of retainers connect the first and second side-plates to the solid rotatable vane, each retainer passing through a corresponding one of said plurality of first limiting spacers and the aligned respective one of said second limiting spacers.

* * * * *